Patented Apr. 9, 1929.

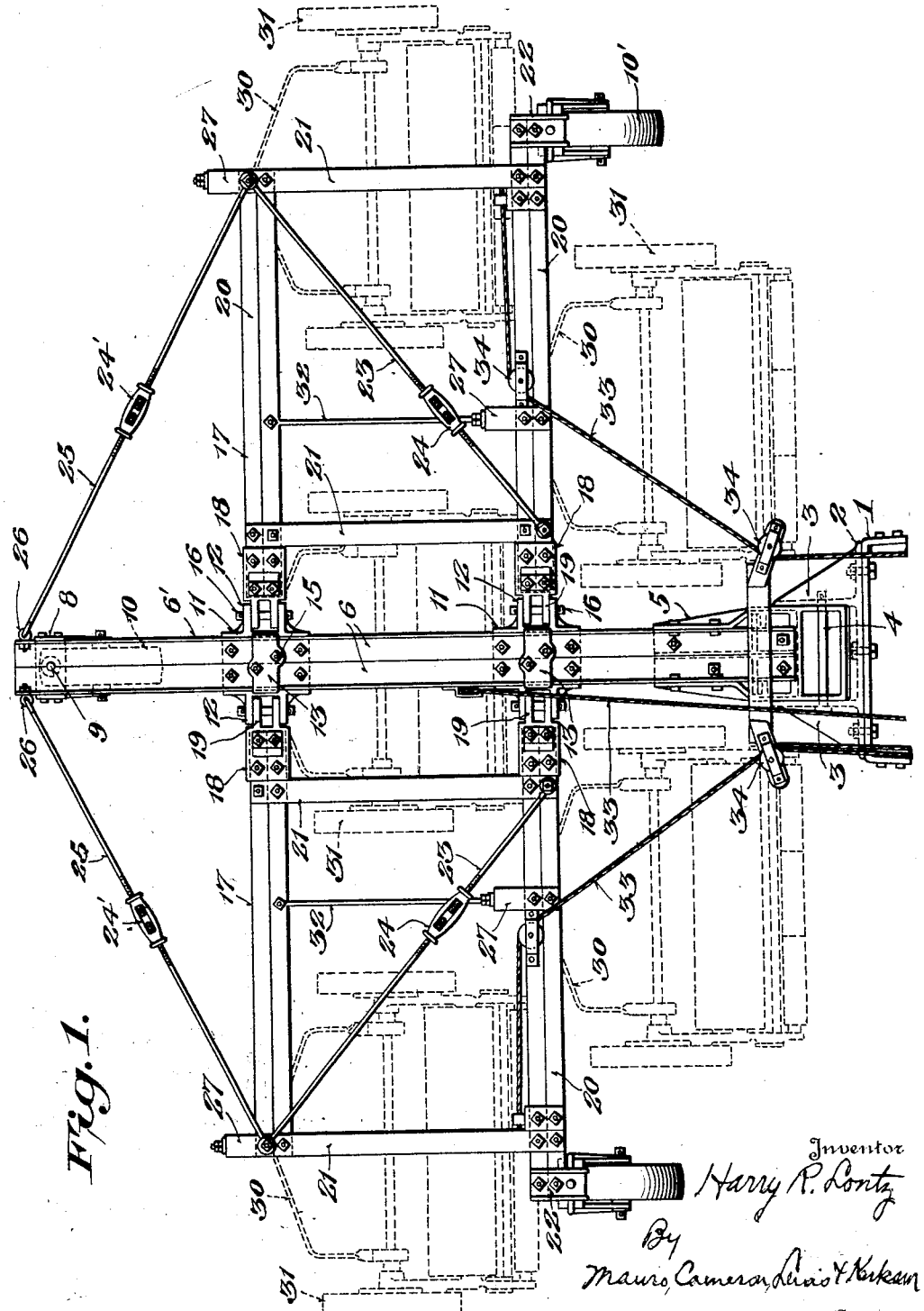

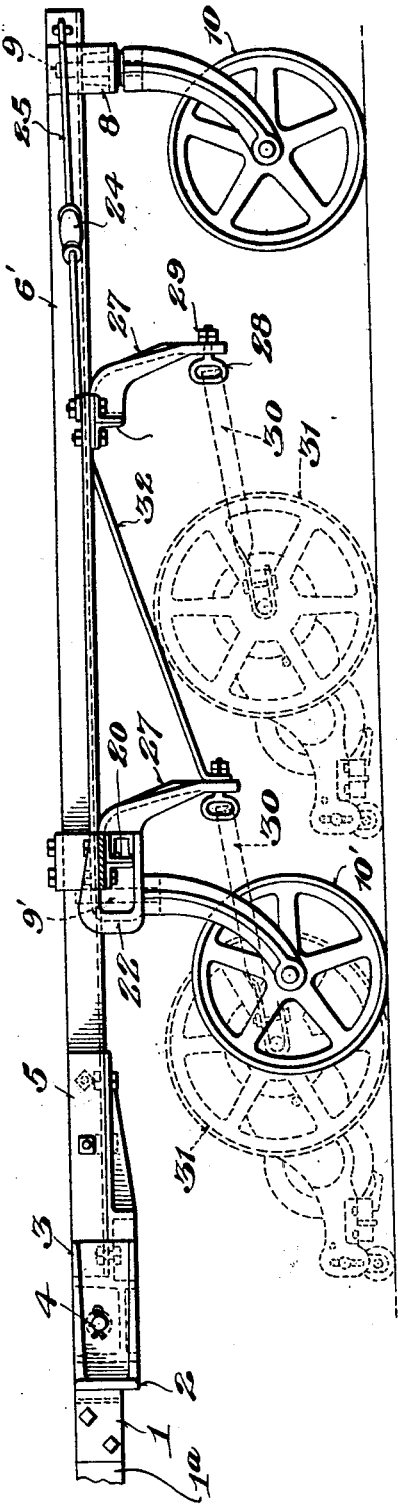

1,708,227

UNITED STATES PATENT OFFICE.

HARRY R. LONTZ, OF RICHMOND, INDIANA, ASSIGNOR, BY MESNE ASSIGNMENTS, TO THE F. & N. LAWN MOWER COMPANY OF DELAWARE, OF RICHMOND, INDIANA, A CORPORATION OF DELAWARE.

GANG LAWN MOWER.

Application filed March 12, 1923. Serial No. 624,614.

This invention relates to lawn mowers, and particularly to gang lawn mowers comprising a plurality of mower units of the rotating cutting-reel type, each capable of independent movement for accommodating itself to undulations in the ground surface.

It has heretofore been proposed to provide a gang lawn mower in which the individual mower units are connected to a rigid frame in such a manner that they may individually assume different horizontal and vertical angles relative to said frame and to each other. It is frequently necessary to operate such mowers over ground which is so uneven, as, for example, when employed on golf courses, that some of the mower units are partially lifted from the ground. When a majority of the mower units are operating on level ground at the same time that the remainder of said units are moving over abruptly sloping ground the limitation to movement imposed on the latter units by their connections to the rigid frame is such that the full weight of the last-mentioned units is not available for maintaining the cutting-reels of the same in proper cutting relation to the grass to be mowed.

In order that the individual mower units may have universal movement relative to the frame, and particularly when said units are "trailers", it is necessary that ground-engaging wheels be provided for supporting the weight of said frame. Wheels of the type heretofore provided have been so disposed, relative to the frame structure, that they greatly increase the difficulty of steering the gang mower over the ground, particularly when the mower is of the type designed to be pushed ahead of the tractor or other power means.

An object of this invention is to provide a gang lawn mower so constructed that the mower units on one side thereof may mow on an abrupt slope while the units on the opposite side are cutting on level ground, or on oppositely sloping ground, the full weight of each unit beign available at all times to maintain the cutting reels in proper relation to the ground.

Another object of this invention is to provide a plurality of ground-engaging wheels for supporting the mower frame, so arranged, relative to the weight to be carried, as to greatly facilitate the steering of the gang mower.

Other objects of the invention are to provide a flexible mower frame which may be pivotally connected to the frame of the tractor, or other propelling means, in such a manner as to permit vertical movement of said mower frame relative to the propelling means; and to provide a structure that is rugged and durable, of relatively light weight, that may be quickly attached and detached from the propelling means, and one that may be readily assembled or disassembled.

The invention will be readily understood by reference to the accompanying drawings, illustrating one embodiment of the inventive idea, in which:—

Fig. 1 is a top plan view illustrating one form of my improved gang mower;

Fig. 2 is a side elevation, somewhat enlarged, of the structure shown in Fig. 1; and Fig. 3 is a detail, partly in section, illustrating one manner in which the transverse members of the frame may be secured to the central girder thereof.

Referring to the drawings, wherein like reference numerals refer to like parts throughout the several views, 1 is a portion of a frame which may be attached in any desired manner to a tractor, a portion of which is shown at 1ª or other suitable propelling means, as is well known in the art.

Rigidly secured to frame 1, as by means of bolts, is a casting 2 provided with the forwardly extending jaws 3, 3, to which is pivotally secured, by means of a horizontally disposed king pin 4, a channel-shaped casting 5. Jaws 3 prevent lateral movement of casting 5 without interfering with the pivotal movement of the latter in a vertical plane. Rigidly attached at their after ends to casting 5, and braced thereby, are a pair of longitudinally extending L-beams 6 which form the central girder or backbone 6′ of the mower frame proper. The forward ends of L-beams 6 are rigidly braced and held together by means of a U-shaped bracket 8 to which is pivotally secured, for movement about a vertical axis 9, the castor or ground-engaging wheel 10 for supporting the forward end of girder 6'.

Rigidly attached to the lower surface of the channel beam formed by L-beams 6, and at any suitable points along the length thereof, are castings 11 provided on the opposite sides thereof with laterally extending ears 12. In order to strengthen girder 6' adjacent the points of attachment of castings 11, there are preferably provided bracing members 13 having downwardly extending ribs 14, on the lower side thereof, which ribs engage the upper horizontal surfaces of L-beams 6. If desired, members 13 may be secured in place by means of bolts 15 extending downwardly through beams 6 and castings 11.

Pivotally secured to ears 12 by means of horizontally disposed pivot pins 16 are transversely extending members 17. Preferably members 17 comprise castings 18, provided at their inner ends with ears 19 which engage pins 16, and T-beams 20. Longitudinally extending bracing strips 21, secured at their opposite ends to members 17, may be provided in order to strengthen the structure. As here shown, four such bracing strips are employed. Brackets 22 are provided adjacent the outer ends of the two rear transverse members 17 to receive the vertical pivots 9' of castors or ground-engaging wheels 10'.

In order to insure against sagging of the transversely extending frame portions formed by members 17 and strips 21, diagonally disposed tie rods 23, provided with turn buckles 24 intermediate their ends, may be secured to the forward and after member 17 in any suitable manner, as illustrated in Fig. 1. Tie rods 25, pivotally secured at their forward ends to girder 6' as by means of eyebolts 26, and at their after ends to, or adjacent, the outer ends of the front pair of members 17, relieve ears 12 and 19 of all twisting strains that would otherwise be imposed on these parts during the operation of the machine without preventing vertical movement of members 17 about pins 16. Rods 25 are preferably provided with turnbuckles 24'.

Laterally spaced at suitable intervals, and extending downwardly from members 17, are a plurality of towing brackets 27 which carry in the lower ends thereof loosely fitted eyebolts 28 provided with lock nuts 29. Passing through the eyes of bolts 28 are draft bars 30 of a plurality of individual mower units 31, of any suitable type, which are preferably disposed in two ranks. When an odd number of units is employed in one of said ranks, as is the case in the front row of units illustrated in Fig. 1, bracket 27 for the center unit will be secured to girder 6' instead of to one of the members 17. Tie rods 32 are preferably provided between the brackets for the after mower units and the front transverse members 17. 33 are flexible cables led from levers (not shown) on the tractor frame, over suitable pulleys 34 to the frames of mower units 31 for raising the rotating cutting-reels from the ground into inoperative position.

When my improved gang lawn mower is operated over uneven ground, it will now be seen that the full weight of each mower unit will at all times be available for maintaining the cutting-reels in proper cutting relation to the grass to be mowed. Each mower unit has universal movement relative to the frame portions formed by members 17 and strips 21, which portions may move vertically relative to central girder 6'', tie rods 25 relieving ears 12 and 19 of twisting strains without preventing said vertical movement.

I have thus provided a gang lawn mower having a flexible frame, and a flexible connection with the propelling means, and one in which the trailing mower units are maintained in such relative positions that they will cut an unbroken swath. The ground-engaging wheels for supporting said frame are so positioned as to greatly facilitate steering of the gang mower and propelling means, and sharp turns may be made without danger of said wheels cutting into and damaging the surface to be mowed.

The invention is capable of receiving a variety of mechanical expressions, one of which, for purposes of illustration has been illustrated in the accompanying drawing, but it is to be expressly understood that the drawings are for purposes of illustration only and are not designed as a definition of the limits of the invention, reference being had to the appended claims for this purpose.

What is claimed is:—

1. A gang lawn mower adapted to be propelled by a tractor comprising a plurality of lawn mower units, a longitudinally extending central girder, a plurality of transversely extending members pivotally secured at their inner ends to said girder for movement in vertical planes, and a plurality of ground-engaging wheels for supporting said girder and members off the ground, said mower units being independently connected with said transverse members and having universal movement relative thereto.

2. A gang lawn mower comprising a plurality of mower units, a longitudinally extending girder, a plurality of transversely extending members pivotally secured at their inner ends to said girder, a ground-engaging wheel pivotally secured to the forward end of said girder, and ground-engaging wheels secured to the outer ends of the two rear transverse members.

3. A gang lawn mower comprising, in combination with a power means, a longitudinally extending central girder, a plurality of transverse members pivotally secured at their inner ends to said girder, a plurality of lawn mower units independently connected with said transverse members, ground-engaging means for supporting the weight of said girder and members, and means for pivotally securing the after end of said girder to said power means.

4. A gang lawn mower comprising a central longitudinally extending girder, a plurality of transversely extending members pivotally secured at their inner ends to said girder, means for connecting the outer ends of said transverse members, a plurality of ground-engaging wheels for supporting said girder and members, means for securing the after end of said girder to a source of propelling power, and a plurality of mower units having rotating cutting reels pivotally secured to said members.

5. A gang lawn mower frame comprising, in combination with a tractor, a longitudinally extending girder, a plurality of transversely extending members pivotally secured at their inner ends to said girder for movement in vertical planes, a ground-engaging wheel pivotally secured to the forward end of said girder, ground-engaging wheels pivotally secured to the outer end of the rear pair of said transverse members and a pair of diagonally disposed tie rods secured at their rear ends to the rear pair of members and at their forward ends adjacent the outer ends of the front pair of transverse members.

6. A gang lawn mower comprising, in combination with a tractor, a longitudinally extending central girder, a plurality of transversely extending members pivotally secured at their inner ends to said girder for movement about a horizontal axis, a plurality of trailing lawn mower units independently secured to said transverse members, ground-engaging wheels for supporting said girder and transverse members independently of said lawn mower units, and means pivotally securing the after end of said girder to said tractor for movement in a vertical plane.

7. A gang lawn mower comprising, in combination with power means for propelling said mower, a longitudinally extending girder, transverse members pivotally secured to said girder for movement about a horizontal axis, ground-engaging wheels for respectively supporting said girder and members, a plurality of lawn mower units having rotating cutting reels secured to said members, said units being disposed in one or more ranks, and a plurality of eye-bolts for connecting said units to said members.

8. A gang lawn mower comprising, in combination with power means for propelling said mower, a main girder, a ground-engaging wheel for supporting one end of said girder, frame portions pivotally secured to said girder on the opposite sides thereof, ground-engaging wheels for supporting said frame portions, a plurality of mower units pivotally secured to said portions, and means for pivotally connecting said girder to said power means.

9. A gang lawn mower adapted to be propelled by a tractor comprising a main girder, means for pivotally connecting said girder to said tractor for relative movement in a vertical plane, a pair of frame portions pivotally connected to said girder, a plurality of mower units pivotally connected to said portions, and means for supporting said girder and portions.

10. In a gang lawn mower, the combination of a longitudinally extending girder, a pair of transversely extending frame portions pivotally connected to said girder, ground-engaging means for supporting said girder and frame portions, a plurality of mower units having rotating, cutting-reels pivotally secured to said frame portions, and means for raising said cutting-reels from the ground.

11. The combination, with the forward portion of a tractor, of a middle section pivotally connected therewith, end sections pivoted on said middle section for tilting to an upright position, and rods detachably connecting said middle section with said end sections.

In testimony whereof I have signed this specification.

HARRY R. LONTZ.